United States Patent
Yasumaru et al.

(10) Patent No.: US 10,016,743 B2
(45) Date of Patent: Jul. 10, 2018

(54) ACTIVATED CARBON HAVING BASIC FUNCTIONAL GROUPS AND METHOD FOR PRODUCING SAME

(71) Applicants: KANSAI COKE AND CHEMICALS CO., LTD., Hyogo (JP); MC Evolve Technologies Corporation, Hyogo (JP)

(72) Inventors: Junichi Yasumaru, Hyogo (JP); Noriyasu Akamatsu, Hyogo (JP); Takaki Tsukazaki, Hyogo (JP); Naoki Matoba, Hyogo (JP)

(73) Assignees: KANSAI COKE AND CHEMICALS CO., LTD., Hyogo (JP); MC EVOLVE TECHNOLOGIES CORPORATION, Hyogo (JP)

( * ) Notice: Subject to any disclaimer, the term of this patent is extended or adjusted under 35 U.S.C. 154(b) by 0 days.

(21) Appl. No.: 15/647,587

(22) Filed: Jul. 12, 2017

(65) Prior Publication Data

US 2017/0304802 A1 Oct. 26, 2017

Related U.S. Application Data (62) Division of application No. 14/420,092, filed as application No. PCT/JP2013/071669 on Aug. 9, 2013, now Pat. No. 9,731,272.

(30) Foreign Application Priority Data

Aug. 9, 2012 (JP) .................................. 2012-177233

(51) Int. Cl.
*B01J 20/30* (2006.01)
*B01J 20/20* (2006.01)
(Continued)

(52) U.S. Cl.
CPC .......... *B01J 20/3078* (2013.01); *B01J 20/20* (2013.01); *B01J 20/28004* (2013.01);
(Continued)

(58) Field of Classification Search
None
See application file for complete search history.

(56) References Cited

U.S. PATENT DOCUMENTS

2003/0038084 A1* 2/2003 Mitchell .................. B01J 20/20
210/663
2003/0096703 A1 5/2003 Mitchell et al.
(Continued)

FOREIGN PATENT DOCUMENTS

CN 102822093 12/2012
JP 2-131136 5/1990
(Continued)

OTHER PUBLICATIONS

Office Action dated Sep. 30, 2017 in Chinese Application No. 201380042335.3, with English translation.
(Continued)

*Primary Examiner* — Joseph A Anthony
(74) *Attorney, Agent, or Firm* — Wenderoth, Lind & Ponack, L.L.P.

(57) ABSTRACT

The present invention provides activated carbon with which hydrophilicity is excellent and the amount of steam adsorbed is increased, and provides a method for producing this activated carbon. This activated carbon is characterized in that the amount of basic functional groups in the activated carbon is 0.470 meq/m² or greater. Preferably the amount of basic groups per specific surface area of activated carbon is 0.200 µeq/m² or greater and the ratio of the amount of basic functional groups and the amount of acidic functional groups (basic functional groups/acidic functional groups) is
(Continued)

1.00 or greater. This method for producing activated carbon is characterized in comprising a step for imparting basic functional groups by bringing the activated carbon into contact with a basic substance. According to a preferred embodiment, the method comprises a step for heating the resulting activated carbon in an insert atmosphere.

12 Claims, 3 Drawing Sheets

(51) Int. Cl.
*B01J 20/28* (2006.01)
*C01B 32/354* (2017.01)
*C01B 32/348* (2017.01)
*C01B 31/08* (2006.01)
*C01B 31/12* (2006.01)

(52) U.S. Cl.
CPC ... *B01J 20/28011* (2013.01); *B01J 20/28057* (2013.01); *B01J 20/28069* (2013.01); *B01J 20/28078* (2013.01); *B01J 20/3021* (2013.01); *B01J 20/3071* (2013.01); *B01J 20/3085* (2013.01); *C01B 31/083* (2013.01); *C01B 31/125* (2013.01); *C01B 32/348* (2017.08); *C01B 32/354* (2017.08)

(56) References Cited

U.S. PATENT DOCUMENTS

| | | | |
|---|---|---|---|
| 2003/0217963 A1 | 11/2003 | Mitchell et al. | |
| 2003/0217967 A1 | 11/2003 | Mitchell et al. | |
| 2004/0129617 A1 | 7/2004 | Tanner et al. | |
| 2004/0159596 A1 | 8/2004 | Mitchell et al. | |
| 2004/0164018 A1 | 8/2004 | Mitchell et al. | |
| 2005/0079167 A1* | 4/2005 | Sonobe | A61K 33/44 424/125 |
| 2005/0112114 A1 | 5/2005 | Sonobe et al. | |
| 2005/0263453 A1 | 12/2005 | Collias et al. | |
| 2005/0279696 A1 | 12/2005 | Bahm et al. | |
| 2009/0008323 A1 | 1/2009 | Bahm et al. | |
| 2009/0218291 A1 | 9/2009 | Mitchell et al. | |
| 2009/0218292 A1 | 9/2009 | Mitchell et al. | |
| 2009/0230061 A1 | 9/2009 | Mitchell et al. | |
| 2009/0308800 A1 | 12/2009 | Bahm et al. | |
| 2010/0006507 A1 | 1/2010 | Tanner et al. | |
| 2011/0155661 A1 | 6/2011 | Bahm et al. | |
| 2013/0023405 A1* | 1/2013 | Hitomi | B01J 21/18 502/180 |

FOREIGN PATENT DOCUMENTS

| | | |
|---|---|---|
| JP | 2000-313610 | 11/2000 |
| JP | 2005-517522 | 6/2005 |
| JP | 2006-111604 | 4/2006 |
| JP | 2009-56449 | 3/2009 |
| KR | 10-0669490 | 1/2007 |
| WO | 2004/039381 | 5/2004 |
| WO | 2011/125504 | 10/2011 |

OTHER PUBLICATIONS

Notice of Submission of Opinion dated Jan. 9, 2018 in Korean Application No. 10-2017-7028671, with English translation.
Office Action dated May 13, 2014 in corresponding Japanese Application No. 2012-177233, with English translation.
Office Action dated Feb. 3, 2015 in corresponding Japanese Application No. 2012-177233, with English translation.
Shimooka et al., "Development of Hydrophilic Active Carbon for High Performance Adsorption Heat Pump", Journal of Chemical Engineering, vol. 32, No. 6, 2006, pp. 528-534, with English translation.
Sakao et al., "Preparation of Nitrogen-Containing Porous Carbon Material and Water Vapor Adsorption Properties thereof", SCEJ 76th Annual Meeting, vol. 42, 2011, p. 222, with English translation.
Okayama et al., "Absorption of copper ( II ) ions onto activated carbons treated by ammonia gas", Journal of Environmental Chemistry, vol. 18, No. 4, 2008, pp. 533-539, with English translation.
International Search Report dated Nov. 12, 2013 in International (PCT) Application No. PCT/JP2013/071669.
Chinese Office Action dated Dec. 2, 2015 in corresponding Chinese Patent Application No. 201380042335.3 (English translation).
Office Action dated Aug. 29, 2016 in corresponding Chinese patent application No. 201380042335.3, with English translation.
Notice of Submission of Opinion dated Sep. 22, 2016 in corresponding Korean Application No. 10-2014-7034993, with English Translation.
Chinese Office Action dated Mar. 1, 2017 in corresponding Chinese Application No. 201380042335.3, with English translation.
Korean Final Rejection dated May 19, 2017 in corresponding Korean Patent Application No. 10-2014-7034993, together with English translation.

* cited by examiner

ACTIVATED CARBON HAVING BASIC FUNCTIONAL GROUPS AND METHOD FOR PRODUCING SAME

CROSS REFERENCE TO RELATED APPLICATIONS

This application is a divisional application of Ser. No. 14/420,092 filed Feb. 6, 2015 now U.S. Pat. No. 9,731,272 which is a 371 of PCT/JP2013/071669 filed Aug. 9, 2013.

TECHNICAL FIELD

The present invention relates to an activated carbon imparting basic functional groups and a method for producing the same.

BACKGROUND ART

Activated carbons are used in various applications for adsorption because of their increased specific surface areas and developed pore structures. In order to effectively exhibit functions in such applications, there is an increasing demand for activated carbons that have appropriate physical properties. It is known that physical properties such as adsorption performance of activated carbons are influenced by the structure of the activated carbons and mainly by the specific surface area of the activated carbons. However, since activated carbons are hydrophobic and have low performance in adsorption of polar substances (substances having polar groups) such as water, it has been difficult to apply the activated carbons in applications for adsorption of moisture (water vapor) in air such as an adsorbent for an adsorption heat pump using water vapor as an operation medium. In addition, since activated carbons have poor wettability to water and the contact of activated carbons with water is insufficient, the activated carbons have low adsorption capacity to substances to be adsorbed in water. Consequently, the efficiency of adsorption of substances to be adsorbed in water (liquid) has been low as compared with the case where the activated carbons were used in air (gas).

In recent years, technologies for enhancing the hydrophilicity of activated carbons have been studied through various researches, and activated carbons in which a water vapor adsorption amount can be increased have been proposed, whereas the water vapor adsorption amount has been insufficient in the conventional activated carbons.

For example, in Non-Patent Document 1, a technology for enhancing the hydrophilicity by subjecting activated carbons to oxidation treatment with an oxidizing agent such as hydrochloric acid, nitric acid and the like to impart acidic functional groups to the surface of the activated carbons has been proposed.

Furthermore, in Non-Patent Document 2, a technology for enhancing the hydrophilicity by adding urea or melamine to resorcinol-formaldehyde resin to incorporate nitrogen in the carbon skeleton (ring structure) of the activated carbons has been proposed.

PRIOR ART DOCUMENTS

Non-Patent Documents

[Non-Patent Document 1] Shimooka, Yamazaki, Takewaki et al., "Development of Hydrophilic Active Carbon for High Performance Adsorption Heat Pump", Journal of Chemical Engineering, Vol. 32, No. 6 (2006), pp. 528-534

[Non-Patent Document 2] Sakao, Horikawa, Kato and Hayashi, "Preparation of nitrogen-containing porous carbon material and water vapor adsorption properties thereof", SCEJ 76th Annual Meeting (2011) p. 222

DISCLOSURE OF THE INVENTION

Problems to be Solved by the Invention

The present invention has been made in view of the above circumstances, and an object of the present invention is to provide an activated carbon having improved hydrophilicity, in particular, to provide an activated carbon of which the water vapor adsorption amount is increased, and to provide a method for producing such an activated carbon.

The inventors of the present invention have studied and found that if basic functional groups are imparted to the surface of an activated carbon, the hydrophilicity of the activated carbon is improved and the water vapor adsorption amount of the activated carbon is also increased. Furthermore, the inventors have found that if the activated carbon is treated with a basic substance in the production process of the activated carbon, basic functional groups contributing to improving of the hydrophilicity of the activated carbon can be imparted to the surface of the activated carbon, and the invention has been made based on this finding.

Means for Solving the Problems

A feature of the present invention which can solve above problems is an activated carbon wherein an amount of basic functional group in the activated carbon is 0.470 meq/g or more.

In the present invention, an amount of basic functional group per specific surface area of the activated carbon is preferably 0.200 µeq/m$^2$ or more. Further preferably a ratio of the amount of basic functional group and an amount of acidic functional group (the amount of basic functional group/the amount of acidic functional group) in the activated carbon is 1.00 or more.

It is also preferable in the present invention that the activated carbon is preferably used for adsorption of moisture in air. Also preferable is to use the activated carbon as an adsorbent.

A feature of the present inventive method which can solve above problems is the method comprising a step of imparting basic functional group by bringing the activated carbon into contact with a basic substance.

Also, it is preferable that the method comprises a step of subjecting the activated carbon obtained in the step of imparting basic functional group to a heating treatment under an inert atmosphere.

It is also preferable that the method comprises a step of washing the activated carbon obtained by an activation treatment with an inorganic acid.

An adsorbent using an activated carbon produced by the method is also included in the present invention.

Advantageous Effects of the Invention

Since an activated carbon of the present invention has an increased amount of basic functional group, the hydrophilicity of the activated carbon is improved and the increase effect of a water vapor adsorption amount can be exhibited.

Furthermore, according to a method of the present invention, the amount of basic functional group of the activated carbon can be increased, and the activated carbon excellent in hydrophilicity can be obtained. In particular, the activated carbon of which the water vapor adsorption amount is increased can be obtained.

MODE FOR CARRYING OUT THE INVENTION

Regarding water vapor adsorption behavior of activated carbons, it has been known that an adsorption amount in a lower relative pressure range (hereinafter, may often be referred simply to as "adsorption amount") is small and rapidly rises in a middle relative pressure range (Non-Patent Document 2). Accordingly, as a result of intensive studies, the inventors have found that by increasing basic functional groups such as amino groups on the surface of activated carbon, the hydrophilicity can be improved, and a water vapor adsorption amount per activated carbon unit mass in a lower relative pressure range can be significantly increased.

In the present invention, a lower relative pressure means that a ratio (relative pressure: $P/P_0$) of a water vapor pressure P [mmHg] in an adsorption equilibrium state (adsorption equilibrium pressure) and a saturated vapor pressure $P_0$ [mmHg] of water vapor is equal to or lower than 0.6.

The amount of basic functional group of an activated carbon of the present invention is 0.470 meq/g or more. When the amount of basic functional group of the activated carbon increases, the hydrophilicity improves and the water vapor adsorption amount in a lower relative pressure range also increases. The amount of basic functional group of the activated carbon is preferably 0.480 meq/g or more, more preferably 0.500 meq/g or more. The upper limit of the amount of basic functional group of the activated carbon is not particularly limited, but the amount of basic functional group of the activated carbon is preferably 2.00 meq/g or less, more preferably 1.50 meq/g or less, further more preferably 1.00 meq/g or less.

Furthermore, adsorption performance of the activated carbon is considerably affected by the amount of basic functional group per specific surface area ($\mu eq/m^2$), and it has been found that the adsorption performance differs between the amounts of basic functional group per specific surface area of 0.200 $\mu eq/m^2$ or more and of less than 0.200 $\mu eq/m^2$. That is, if the amount of basic functional group of the activated carbon is equal to or more than the above given value and, in addition, the amount of basic functional group per specific surface area increase, the hydrophilicity further improves and the water vapor adsorption amount also increases, which is preferable. The amount of basic functional group per specific surface area is preferably 0.200 $\mu eq/m^2$ or more, more preferably 0.230 $\mu eq/m^2$ or more. The upper limit of the amount of basic functional group per specific surface area is not particularly limited.

The activated carbon of the present invention shows a tendency that the amount of acidic functional group decreases when the amount of basic functional group is increased. The reason therefor is considered that during the production process of the activated carbon, the acidic functional groups present on the surface of the activated carbon are removed and the basic functional groups are imparted to the surface of the activated carbon from which the acidic functional groups have been removed. In order to achieve the hydrophilicity improving effect by increasing the amount of basic functional group, a ratio of the amount of basic functional group and the amount of acidic functional group of the activated carbon (the amount of basic functional group/the amount of acidic functional group) is preferably 1.00 or more, more preferably 1.05 or more, further more preferably 1.10 or more. There is no particular limitation on the upper limit of the ratio of the amount of basic functional group and the amount of acidic functional group of the activated carbon. However, the amount of basic functional group and the amount of acidic functional group are preferably prepared such that the ratio of the amount of basic functional group and the amount of acidic functional group is to be 1.00 or more. For example, the amount of acidic functional group is preferably 1.5 meq/g or less, more preferably 1.0 meq/g or less, further more preferably 0.8 meq/g or less.

The shape of the activated carbon of the present invention is not particularly limited and can be selected depending on the application. As examples of the shape, powdered form, granular form, fibrous form, and the like can be given. For example, when using the activated carbon as an adsorbent in a liquid such as water, fibrous activated carbons (for example, fiber diameter of about 5 to 30 $\mu m$) may be used from the viewpoint of water permeability and pressure loss reduction.

In the present invention, the upper limit and the lower limit of the specific surface area of the activated carbon are not particularly limited from the viewpoint of adsorption performance. However, the adsorbing capability of the activated carbon tends to improve as the specific surface area of the activated carbon increases, and hence, the specific surface area of the activated carbon is preferably 500 $m^2/g$ or more, more preferably 800 $m^2/g$ or more. Furthermore, the strength of the activated carbon may decrease if the specific surface area excessively increases, and hence, the specific surface area of the activated carbon is preferably 4000 $m^2/g$ or less, more preferably 3500 $m^2/g$ or less. Here, the specific surface area of the activated carbon is a value determined by the BET method for measuring a nitrogen adsorption isotherm.

The pore volume (total pore volume) and the pore diameter of the activated carbon of the present invention are not particularly limited. The pore volume and the pore diameter of the activated carbon may be appropriately prepared depending on a substance to be adsorbed. For example, the total pore volume is preferably 0.2 $cm^3/g$ or more, more preferably 0.5 $cm^3/g$ or more, and is preferably 3.0 $cm^3/g$ or less, more preferably 2.8 $cm^3/g$ or less. Here, the total pore volume means a value determined by the nitrogen adsorption method for measuring a nitrogen adsorption amount when the relative pressure $P/P_0$ (P: gas pressure of an adsorbate under an adsorption equilibrium, $P_0$: saturated vapor pressure of an adsorbate at an adsorption temperature) is at 0.93. The average pore diameter is preferably 1.5 nm or more, more preferably 1.6 nm or more, and is preferably 4.0 nm or less, more preferably 3.5 nm or less. Here, the average pore diameter is a value calculated by using the specific surface area determined by the BET method and the total pore volume determined by the nitrogen adsorption method and assuming that the shape of the pore is cylindrical

[(4×total pore volume determined by the nitrogen adsorption method)/specific surface area determined by the BET method].

Note that the specific surface area, the total pore volume, the average pore diameter and the like of the activated carbon of the present invention can be prepared by appropriately selecting an activated carbon raw material, heating conditions and the like.

The hydrophilicity of the activated carbon of the present invention can be represented by a water vapor adsorption amount. That is, this is because if the hydrophilicity of the activated carbon is improved, the wettability between the surface of the activated carbon and water rises, and hence the water vapor adsorption amount increases. Furthermore, the adsorption performance of the activated carbon of the present invention is represented by the water vapor adsorption amount as shown in Examples that will be described later. However, since the activated carbon having a higher adsorption performance for water vapor exhibits an excellent adsorption performance also for various polar substances, the adsorption performance of the activated carbon of the present invention is not limited to the adsorption performance for water vapor. Therefore, the activated carbon of the present invention (including activated carbons obtained by the production method of the present invention described later) can be used as activated carbons for adsorption in various applications such as moisture adsorption in air, deodorization, removal of toxic substances and the like, and, for example, is preferable as an adsorbent of a filler for gas adsorption, a filler (filter material, adsorbing material) for a water purifier, or the like.

Since the hydrophilicity improves by imparting basic functional groups, the hydrophilicity with water increases so that an excellent dispersibility can be achieved. For example, when using for electrode materials, the activated carbon of the present invention can be used as an activated carbon for electrode having improved coating properties, improved wettability with electrolyte, and in addition, being excellent in durability due to decreasing of the amount of acidic functional group.

Figure 1:
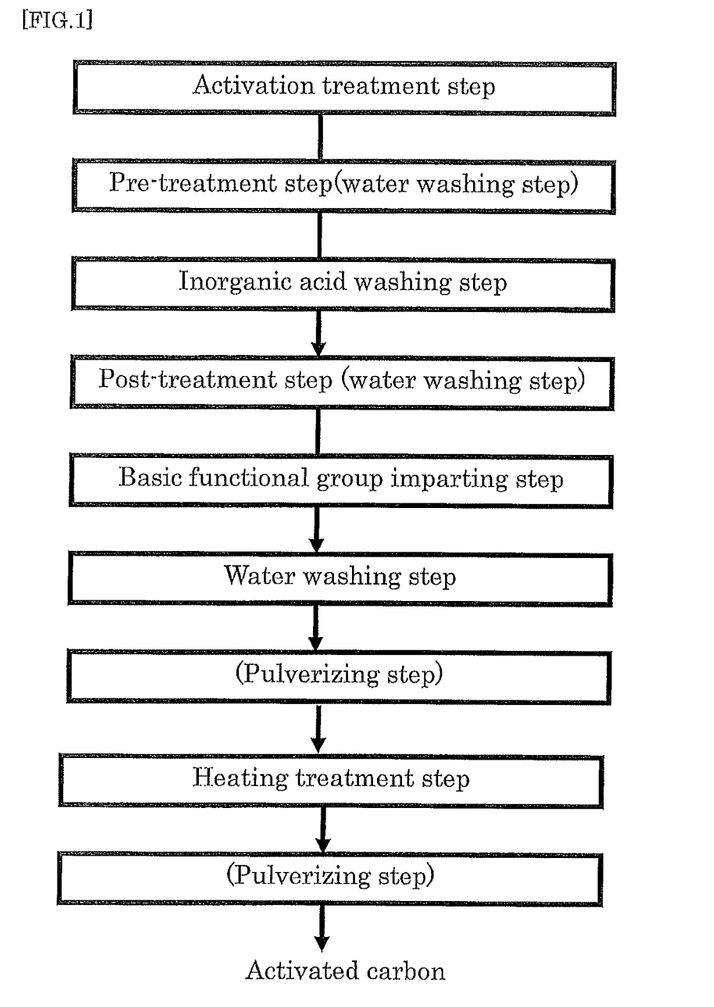
FIG. 1 is a schematic flowchart illustrating the production process of an activated carbon of the present invention.

Hereinafter, the method for producing an activated carbon having basic functional groups of present invention will be described based on the schematic flowchart shown in FIG. 1. However, the production method of the present invention is not limited to the following production method, and also can be appropriately changed.

(Activation Treatment Step)

The activation treatment step is a step of forming pores on the surface of a carbonaceous material and/or a carbide of a carbonaceous material (hereinafter, may often be collectively referred to as "carbide") to increase the specific surface area and the pore volume.

As the carbonaceous material used in this step, there is no specific limitation as long as it is a carbonaceous material known as an activated carbon raw material. Examples of the carbonaceous material include Non-graphitizing carbons such as wood, sawdust, charcoal, coconut shell, cellulosic fibers, synthetic resin (phenol resin, for example), and the like; graphitizing carbon such as mesophase pitch, pitch coke, petroleum coke, coal coke, needle coke, polyvinyl chloride, polyimide, PAN, and the like; and the composite thereof. These carbonaceous materials may be used singly or in combination of two or more. Synthetic resin such as phenolic resin, and the combination of synthetic resin and other carbonaceous materials (paper phenol resin compound, for example) are preferable.

The carbonaceous material may be optionally subjected to a high-temperature-carbonization treatment before the activation treatment. Carbide of the carbonaceous material used in this step can be obtained by subjecting the above-mentioned carbonaceous material to a heat treatment at 400° C. to 1000° C. for one to three hours in an inert gas.

As for the method of activation treatment, gas activation, chemical activation, and the like can be given. The gas activation is a method for performing the activation treatment by supplying an activation gas after heating the carbide to a predetermined temperature. As the activation gas, water vapor, air, carbon dioxide, oxygen, combustion gas, and a mixed gas thereof can be used. The chemical activation is a method for performing the activation treatment by mixing a carbonaceous material and/or a carbide of a carbonaceous material and an activator and heating the mixture. In the method for producing an activated carbon of the present invention, the method of activation treatment is not particularly limited. However, as the method of activation treatment, it is preferable to adopt an alkali activation treatment step in which an activator containing an alkali metal compound and a carbonaceous material and/or a carbide of a carbonaceous material are mixed, the mixture is heated in an inert gas, thereby obtaining a activated carbon. By the alkali activation, the activated carbon having a larger specific surface area can be obtained. Although when adopting the alkali activation, the amount of acidic functional group of the activated carbon after the activation treatment tends to increase, it is possible to reduce the amount of acidic functional group by subjecting a basic functional group imparting step or a heating treatment step described later. In particular, by conducting the heating treatment under a nitrogen atmosphere, the effect in increasing the amount of basic functional group can be further exerted.

A preferred embodiment of the alkali activation treatment step will be described below.

As the above alkali activator, an alkali metal compound is preferable. As the alkali metal compound, there is no limitation as long as it is usually used as an activator of a carbide. Examples of the alkali metal compound include alkali metal hydroxide such as potassium hydroxide, sodium hydroxide and the like; alkali metal carbonates such as potassium carbonate, sodium carbonate and the like; and sulfate of alkali metal such as potassium sulfate, sodium sulfate and the like. Alkali metal hydroxides such as potassium hydroxide, sodium hydroxide and the like are more preferable, and potassium hydroxide is further more preferable.

The activator may include other activators than the alkali metal compound. As the other activators, phosphoric acid, sulfuric acid, calcium chloride, zinc chloride, potassium sulfide and the like can be given, for example.

A larger mixing amount of the activator to the carbonaceous material and/or the carbide of a carbonaceous material tends to increase the specific surface area of an activated carbon, and the mixing amount may be appropriately determined so as to be a desired specific surface area. For example, in order to sufficiently increase the specific surface area of the activated carbon (1500 $m^2/g$ or more, for example), a mass ratio of the activator to the carbide of a carbonaceous material (mass of activator/mass of carbide of carbonaceous material) is preferably 0.5 or higher, more preferably 1 or higher. On the other hand, since a too high mixing ratio of the activator may cause a lower density of the activated carbon, a mass ratio of the activator is preferably 10 or lower, more preferably 5 or lower, further more preferably 4 or lower.

As the inert gas used in this step, argon, helium, nitrogen and the like can be given.

If the heating temperature in this step is lower, the activation does not proceed, and if it is too high, an activation vessel and an activation furnace may be corroded. This is not practical, and hence, the heating temperature is preferably 400 to 900° C., more preferably 500 to 900° C., further more preferably 600 to 900° C. Note that the heating time is not particularly limited and usually 5 hours or shorter.

(Pre-Treatment Step (Water Washing Step))

The pre-treatment step is a step of washing with water optionally after the alkali activation treatment step and prior to an inorganic acid washing step. The pre-treatment step is conducted repeatedly preferably a plurality of times (for example, about two to five times) so that a removal ratio of alkali metals remaining in the activated carbon can be increased.

The temperature of water used in this step is not particularly limited and is preferably 20° C. or higher from the viewpoint of increasing the removal efficiency of the alkali metals. On the other hand, if the temperature of water is too high, the loss of water by evaporation increases, and hence, when this step is conducted under normal pressure, the temperature of water is preferably 100° C. or lower, more preferably 95° C. or lower.

(Inorganic Acid Washing Step)

The inorganic acid washing step is a step of washing the activated carbon subjected to the activation treatment such as alkali activation with an inorganic acid, in which the alkali metals and the like remaining in the activated carbon are washed with the inorganic acid and removed. The inorganic acid washing step is conducted repeatedly preferably a plurality of times (for example, about two to five times) so that a removal ratio of the alkali metal can be increased.

As for the inorganic acid used in this step, there is no particular limitation as long as it is an inorganic acid used to remove alkali metals remaining in the activated carbon when usually conducting the alkali activation. Examples thereof include hydroacid such as hydrochloric acid, hydrofluoric acid and the like, and oxyacid such as sulfuric acid, nitric acid, phosphoric acid, perchloric acid and the like. In particular, hydrochloric acid is preferred.

The inorganic acid used in this step is preferably used as an inorganic acid aqueous solution. The concentration of the inorganic acid in the aqueous solution is not particularly limited. However, from the viewpoint of increasing of the removal efficiency of the inorganic acid and production costs, the concentration is preferably prepared in such a manner that 10 parts by mass to 100 parts by mass of the inorganic acid are supplied relative to 100 parts by mass of the activated carbon after the alkali activation treatment.

Although the liquid temperature of the inorganic acid aqueous solution used in this step is not particularly limited, it is desirable to set it within a temperature range in which the removal efficiency of the alkali metals in the activated carbon can be increased while suppressing volatilization of the inorganic acid. For example, it is preferably 50° C. or higher, and preferably 100° C. or lower, more preferably 85° C. or lower.

(Post-Treatment Step (Water Washing Step))

The post-treatment step is a step of washing with water optionally after the alkali activation treatment step. The post-treatment step is conducted repeatedly preferably a plurality of times (for example, about two to five times) so that a removal ratio of inorganic acids remaining in the activated carbon can be increased.

The temperature of water used in this step is not particularly limited and is preferably 30° C. or higher, more preferably 50° C. or higher, further more preferably 60° C. or higher from the viewpoint of increasing the removal efficiency of the inorganic acids. On the other hand, if the temperature of water is too high, the loss of water by evaporation increases, and hence, when this step is conducted under normal pressure, the temperature of water is preferably 100° C. or lower, more preferably 95° C. or lower.

(Basic Functional Group Imparting Step)

The basic functional group imparting step is a step of imparting basic functional groups by bringing the activated carbon into contact with a basic substance, and the amount of basic functional group of the activated carbon can be increased by this step. Furthermore, the inorganic acids remaining in the activated carbon is neutralized and removed by a neutralization reaction with part of the basic substances, so that the amount of acidic functional group of the activated carbon decreases.

The basic substance used in this step is a substance that undergoes a neutralization reaction with an inorganic acid and that can impart basic functional groups to the surface of the activated carbon. Specifically, examples of the basic substance include thermally decomposable basic substances such as ammonium carbonate, ammonium hydrogen carbonate and the like, organic amine such as methylamine, ethylamine, propylamine, dimethylamine, diethylamine, dipropylamine, trimethylamine, triethylamine and the like, and volatile basic substances such as ammonia and the like. These basic substances may be used singly or in combination of two or more. Preferred is a thermally decomposable basic substance such as ammonium carbonate, ammonium hydrogen carbonate and the like that exhibit an excellent effect in increasing the amount of basic functional group in the activated carbon, and in particular, ammonium hydrogen carbonate is preferable.

This step may be conducted using a solution in which the above basic substance is dissolved in a solvent. Furthermore, it is preferable that salt produced by the neutralization reaction of the inorganic acid and the basic substance be also dissolved in the solvent. Examples of the solvent include water, and alcohols such as methanol, ethanol and the like. These solvents may be used singly or in combination of two or more.

When the basic substance used in this step is thermally decomposable, the liquid temperature of the solution used in this step is preferably set at a temperature lower than the thermal decomposition temperature of the basic substance. Furthermore, when the basic substance used is volatile, it is preferably set at a temperature where the basic substance hardly volatilize as much as possible.

The amount of the basic substance used in this step is not particularly limited, and for example, it is preferred to supply the basic substance of preferably 0.5 parts by mass or more, more preferably 1.0 parts by mass or more, and preferably 100 parts by mass or less, more preferably 50 parts by mass or less relative to the activated carbon of 100 parts by mass.

This step may be conducted repeatedly a plurality of times until the concentration of the inorganic acid in the activated carbon becomes equal to or lower than a desired value. However, in the case where a water washing step described later is conducted, it is preferred that this step be conducted repeatedly until the inorganic acid content in 1 kg of the activated carbon becomes equal to or less than 500 mg (in the case where the activated carbon further contains one or more metals, until each of the metal content becomes equal to or less than 200 mg (for example, each of the content of K, Fe and Ni becomes equal to or less than 200 mg)).

(Water Washing Step)

The method for producing an activated carbon of the present invention may include a water washing step in which after the basic functional group imparting step using the above basic substance, the resulting activated carbon is further washed with water. The water washing step is conducted repeatedly a plurality of times (for example, about two to five times) so that a removal ratio of the inorganic acid and the like remaining in the activated carbon can be further increased. Furthermore, the basic substances remaining on the surface of the activated carbon and also salt produced by the neutralization reaction of the inorganic acid and the basic substance can be removed.

The temperature of water used in this step is not particularly limited and is preferably 30° C. or higher, more preferably 50° C. or higher, further more preferably 60° C. or higher from the viewpoint of increasing the removal efficiency of the inorganic acid. On the other hand, if the temperature of water is too high, the loss of water by evaporation increases, and hence, when this step is conducted under normal pressure, the temperature of water is preferably 100° C. or lower, more preferably 95° C. or lower.

The water used in this step, within the range where the aim of this step is not impeded, may contain other components. Other components are not limited in particular as long as they can be quickly removed from the activated carbon by heating, and examples thereof include alcohols such as methanol, ethanol, and the like.

(Pulverizing Step)

The pulverizing step is a step in which the activated carbon subjected to the above-mentioned activation treatment is made to a desired size (for example, the average particle diameter of about 1 μm to 20 μm). The pulverizing step may be performed either before or after a heating treatment step described later.

The method for pulverizing of the activated carbon is not particularly limited, and may be performed by using a ball mill, disc mill, bead mill, jet mill or the like. Among these, the ball mill can be easily used and is preferable. Furthermore, the pulverizing method using the ball mil include a wet method and a dry method, and either method may be adopted. The pulverizing conditions may be appropriately changed to obtain a desired average particle diameter. In addition, when preparing the average particle diameter of the activated carbon, classification may be optionally performed. For the classification, for example, a stainless steel sieve, cyclonic classifying device or the like may be used.

(Heating Treatment Step)

The heating treatment step is a step in which the activated carbon obtained in the above-mentioned basic functional group imparting step is subjected to a heating treatment under an inert atmosphere. As an inert gas used in this step, argon, helium, nitrogen and the like can be given, and nitrogen is preferable. By conducting the heating treatment step under an inert atmosphere (preferably under nitrogen atmosphere), while promoting the decomposition or the release of the acidic functional groups remaining in the activated carbon, the amount of basic functional group in the activated carbon can be further increased.

In order to promote the decomposition or the release of the acidic functional groups while suppressing the release (removal) of the basic functional groups in the activated carbon, it is desirable to adopt the following heating temperature and heating time.

The heating temperature of this step is preferably 1500° C. or lower, more preferably 1200° C. or lower, further more preferably 1000° C. or lower, even further more preferably 800° C. or lower. On the other hand, from the viewpoint of enhancing the increase effect of the amount of basic functional group, it is desirable to be preferably 300° C. or higher, more preferably 400° C. or higher, further more preferably 500° C. or higher.

From the viewpoint of enhancing the above effects, the heating time is, in the above temperature range, preferable 1 minute or longer, more preferably 5 minutes or longer, further more preferably 10 minutes or longer. On the other hand, if the heating time is too long, the specific surface area and the pore volume of the activated carbon decrease, which may cause a reduction in adsorption volume, and therefore the heating time is preferably 10 hours or shorter, more preferably 8 hours or shorter, further more preferably 4 hours or shorter.

The present application claims priority to Japanese Patent Application No. 2012-177233 filed on Aug. 9, 2012. The entire contents of the disclosure of Japanese Patent Application No. 2012-177233 filed on Aug. 9, 2012 are incorporated herein by reference.

EXAMPLES

The present invention will be illustrated in further detail with reference to experimental examples below. It should be noted, however, that these examples are never construed to limit the scope of the present invention; and various modifications and changes may be made without departing from the scope and sprit of the present invention described hereinbefore and hereinafter and should be considered to be within the scope of the present invention.

Example 1

<Activation Treatment Step>

A paper phenol resin compound as a carbonaceous material was carbonized at 700° C. for 2 hours under a nitrogen atmosphere to obtain a paper phenol resin compound carbide. To 50 g of the resulting paper phenol resin compound carbide, potassium hydroxide in the mass ratio of 2.5 times (the mass of the activator/the mass of the carbide of the carbonaceous material) was added as an activator and treated at 800° C. for 2 hours under a nitrogen atmosphere to obtain an activated carbon.

<Pre-Treatment Step (Water Washing Step)>

2 L of water (60° C.) was added to the resulting activated carbon, heated at 100° C. for one hour, and then filtered. After filtering, washing and dehydrating were conducted repeatedly using water (60° C.) until the pH of the activated carbon became 9 or less.

<Inorganic Acid Washing Step>

1.7 L of water and 0.3 L of hydrochloric acid (concentration: 35 mass %) were added to the activated carbon obtained by the pre-treatment step, heated at 100° C. for one hour, and then filtered.

<Post-Treatment Step (Water Washing Step)>

Water (60° C.) was added to the activated carbon obtained by the inorganic acid washing step, and washing and dehydrating were conducted repeatedly until the pH became 3 or more.

<Basic Functional Group Imparting Step>

To the resulting activated carbon, an ammonium hydrogen carbonate (NH4HCO3) aqueous solution of 0.1 mass % was added as a basic substance solution to prepare a slurry having an activated carbon concentration of 10 mass %, and the slurry was stirred for 10 minutes and then dehydrated. This step was further conducted repeatedly five times.

<Water Washing Step>

Water (60° C.) was added to the activated carbon obtained by the basic functional group imparting step to prepare a slurry having an activated carbon concentration of 10 mass %, and the slurry was stirred for 10 minutes and then dehydrated, thereby obtaining the activated carbon.

<Pulverizing Step>

The activated carbon obtained by the water washing step was pulverized using a disk mill type vibration mill (manufactured by Kawasaki Heavy Industries, Ltd.) in such a manner that the average particle diameter is to be 5 to 15 µm, thereby preparing the particle size of the activated carbon.

<Heating Treatment Step>

The resulting activated carbon was placed in a muffle furnace (manufactured by Koyo Thermo, Inc.), was heated up to the furnace temperature of 800° C. (temperature rising rate: 10° C./min) under nitrogen circulation (2 L/min), was held for 2 hours at the temperature (800° C.), and subsequently was naturally cooled to room temperature in the furnace, thereby obtaining an activated carbon (A).

Example 2

An activated carbon (B) was produced in the same manner as in Example 1, except for changing the basic substance solution to an ammonium hydrogen carbonate ($NH_4HCO_3$) aqueous solution of 0.5 mass % in the basic functional group imparting step.

Example 3

An activated carbon (C) was produced in the same manner as in Example 1, except for changing the basic substance solution to an ammonium hydrogen carbonate ($NH_4HCO_3$) aqueous solution of 5.0 mass % in the basic functional group imparting step.

Comparative Example 1

An activated carbon (D) was produced in the same manner as in Example 1, except that the basic functional group imparting step and the water washing step after the basic functional group imparting step were not conducted.

As for each of the above-mentioned samples, the specific surface area ($m^2/g$), the amount of acidic functional group (meq/g), the amount of basic functional group (meq/g, µmeq/$m^2$), and the water vapor adsorption amount (cc/g) were measured and the measurement results were shown in Table 1.

(Method for Measuring a Specific Surface Area)

After vacuum-drying the sample (0.2 g) at 250° C., the adsorbed amount of nitrogen gas under a liquid nitrogen atmosphere (−196° C.) was measured using a specific surface area and pore diameter distribution measurement device (ASAP-2400 manufactured by Shimadzu-Micromeritics Corporation) to obtain a nitrogen adsorption isotherm, and the specific surface area ($m^2/g$) was determined by the BET method.

(Method for Measuring an Amount of Acidic Functional Group)

The amount of acidic functional group was determined by following the Boehm method (the details are described in the "H. P. Boehm, Adzan. Catal, 16, 179 (1966)"). Specifically, first, 50 ml of sodium ethoxide solution (0.1 mol/l) was added to 2 g of the sample, and the resulting mixture was stirred for 2 hours at 500 rpm and then allowed to stand for 24 hours. After the lapse of 24 hours, the mixture was further stirred for 30 minutes and then separated by filtration. Hydrochloric acid of 0.1 mol/l was added dropwise to 25 ml of the resulting filtrate, and the titration amount of hydrochloric acid when the pH reached 4.0 was measured. Furthermore, as a blank test, hydrochloric acid of 0.1 mol/l was added dropwise to 25 ml of the above sodium ethoxide solution (0.1 mol/l), and the titration amount of hydrochloric acid when the pH reached 4.0 was measured. Then, the amount of acidic functional group (meq/g) was calculated by the following expression (1).

[Expression 1]

$$\text{Amount of acidic functional group (meq/g)} = \frac{(a-b) \times 0.1}{S \times \frac{25}{50}} \quad (1)$$

a: Titration amount (ml) of hydrochloric acid in the blank test b: Titration amount (ml) of hydrochloric acid when the sample was reacted S: Mass (g) of the sample (Method for Measuring an Amount of Basic Functional Group)

The amount of basic functional group was determined by back titration when measuring the amount of acidic functional group. Specifically, first, 50 ml of hydrochloric acid (0.1 mol/l) was added to 2 g of the sample, and the resulting mixture was stirred for 2 hours at 500 rpm and then allowed to stand for 24 hours. After the lapse of 24 hours, it was further stirred for 30 minutes and then separated by filtration. Sodium hydroxide of 0.1 mol/l was added dropwise to 25 ml of the resulting filtrate, and the titration amount of sodium hydroxide when the pH reached 8.0 was measured. Furthermore, as a blank test, sodium hydroxide of 0.1 mol/l was added dropwise to 25 ml of the above hydrochloric acid (0.1 mol/l), and the titration amount of sodium hydroxide when the pH reached 8.0 was measured. Then, the amount of basic functional group (meq/g) was calculated by the following expression (2).

[Expression 2]

$$\text{Amount of basic functional group (meq/g)} = \frac{(a-b) \times 0.1}{S \times \frac{25}{50}} \quad (2)$$

a: Titration amount (ml) of sodium hydroxide in the blank test b: Titration amount (ml) of sodium hydroxide when the sample was reacted S: Mass (g) of the sample (Amount of Basic Functional Group Per Specific Surface Area)

The amount of basic functional group per specific surface area (µeq/m$^2$) was calculated from the specific surface area (m$^2$/g) determined by the above-mentioned BET method and the amount of basic functional group.

(Method for Measuring a Water Vapor Adsorption Amount)

After heating 40 mg of the sample in vacuum at 250° C., a water vapor adsorption isotherm at 298 K was measured using a high-accuracy gas/vapor adsorption amount measuring device (BELSORP-max, manufactured by BEL Japan, Inc.). From the resulting water vapor adsorption isotherm, the water vapor adsorption amount was calculated at the relative pressure (P/P$_0$) of up to 0.6.

than that of Comparative Example 1. Example 2 has a larger water vapor adsorption amount than that of Comparative Example 1, and as is also clear from this, the effect of the amount of the basic functional group exerted on the water vapor adsorption amount is larger than the effect of the specific surface area.

Moreover, Comparative Example 1 has a larger amount of acidic functional group than that of Example 3, but has a smaller amount of basic functional group than that of Example 3. This Comparative example 1 has a smaller water vapor adsorption amount than that of Example 3, and as is clear from this, the effect of the amount of basic functional group exerted on the water vapor adsorption amount is larger than the effect of the amount of acidic functional group.

TABLE 1

| | Specific surface area | Amount of acidic functional group | Amount of basic functional group | | Amount of basic functional group/ Amount of acidic functional group | Water vapor adsorption amount |
|---|---|---|---|---|---|---|
| | (m$^2$/g) | (meq/g) | (meq/g) | (µmeq/m$^2$) *1 | | (cc/g) |
| Example 1 | 2370 | 0.500 | 0.516 | 0.218 | 1.03 | 111.7 |
| Example 2 | 2340 | 0.486 | 0.541 | 0.231 | 1.11 | 133.4 |
| Example 3 | 2380 | 0.436 | 0.588 | 0.247 | 1.35 | 140.2 |
| Com. Ex. 1 | 2370 | 0.442 | 0.465 | 0.196 | 1.05 | 95.4 |

*1 Amount of basic functional group per specific surface area

The activated carbons of Examples 1 to 3 satisfy the definitions of the present invention and showed a large water vapor adsorption amount (100 cc/g or larger). On the other hand, Comparative Example 1 showed a small amount of basic functional group and a small water vapor adsorption amount (less than 100 cc/g).

Considering the above experimental results in more detail, first, it can be confirmed that in Comparative Example 1 in which the basic functional groups imparting step was not conducted, the amount of basic functional group was small.

In Examples 1 to 3, the higher the basic substance concentration in the basic functional group imparting step, the larger the amount of basic functional group of the activated carbon, and hence, it is effective to increase the basic substance concentration in order to increase the amount of basic functional group.

Furthermore, when comparing Examples 1 to 3, a larger amount of the basic functional group tends to reduce the amount of acidic functional group. As described above, the reason therefor is considered that during the production process of the activated carbon, the acidic functional groups present on the surface of the activated carbon are removed and the basic functional groups are imparted to this surface of the activated carbon from which the acidic functional groups have been removed. Therefore, it is effective to increase the amount of basic functional group in order to reduce the amount of acidic functional group.

Comparing Example 1 and Comparative Example 1 having the same specific surface area, Comparative Example 1 having a smaller amount of basic functional group had a small water vapor adsorption amount. From this, it can be confirmed that the effect of the amount of basic functional group exerted on the water vapor adsorption amount is larger than that of the specific surface area.

The same thing can be also understood by comparing Example 2 and Comparative Example 1. That is, comparing Example 2 with Comparative Example 1, Example 2 has a smaller specific surface area than that of Comparative Example 1 but has a larger amount of basic functional group The above results reveal that increasing of the amount of basic functional group is more effective than increasing of the specific surface area in order to enhance the water vapor adsorption amount.

Figure 2:
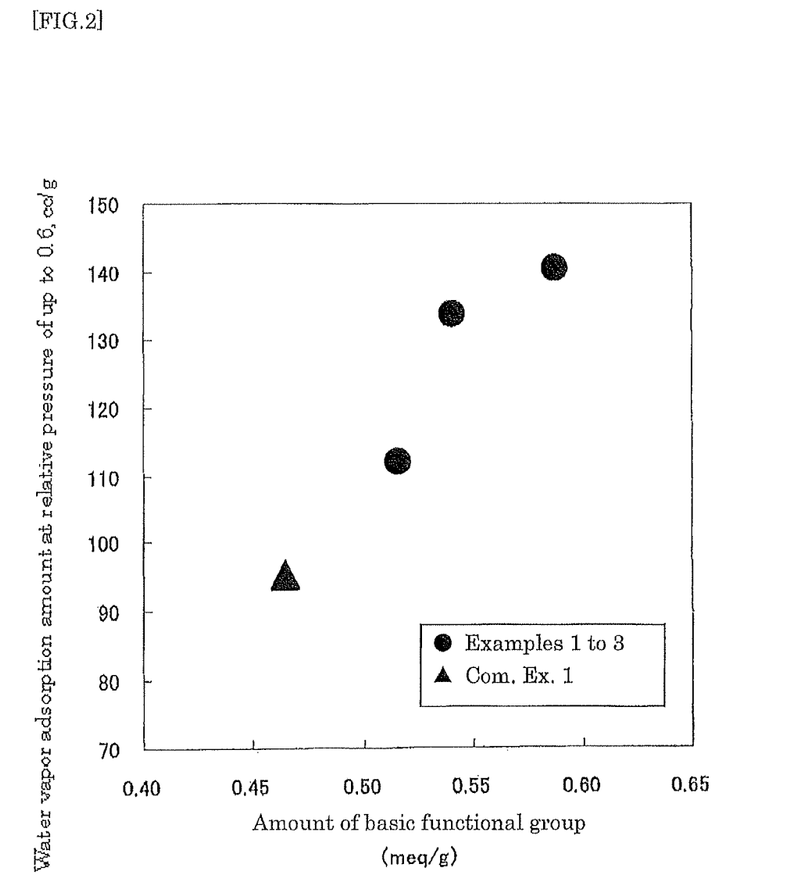
FIG. 2 is a diagram plotting the relationship between the amount of basic functional group and the water vapor adsorption amount in a lower relative pressure range.

FIG. 2 is a diagram plotting the relationship between the amount of basic functional group and the water vapor adsorption amount in a lower relative pressure range (up to 0.6). This diagram reveals that when the amount of basic functional group increases, the water vapor adsorption amount also increases accordingly. In particular, Examples 1 to 3 (black circles in the diagram) in which the amount of basic functional group is equal to or more than 0.470 meq/g indicate a larger water vapor adsorption amount.

Figure 3:
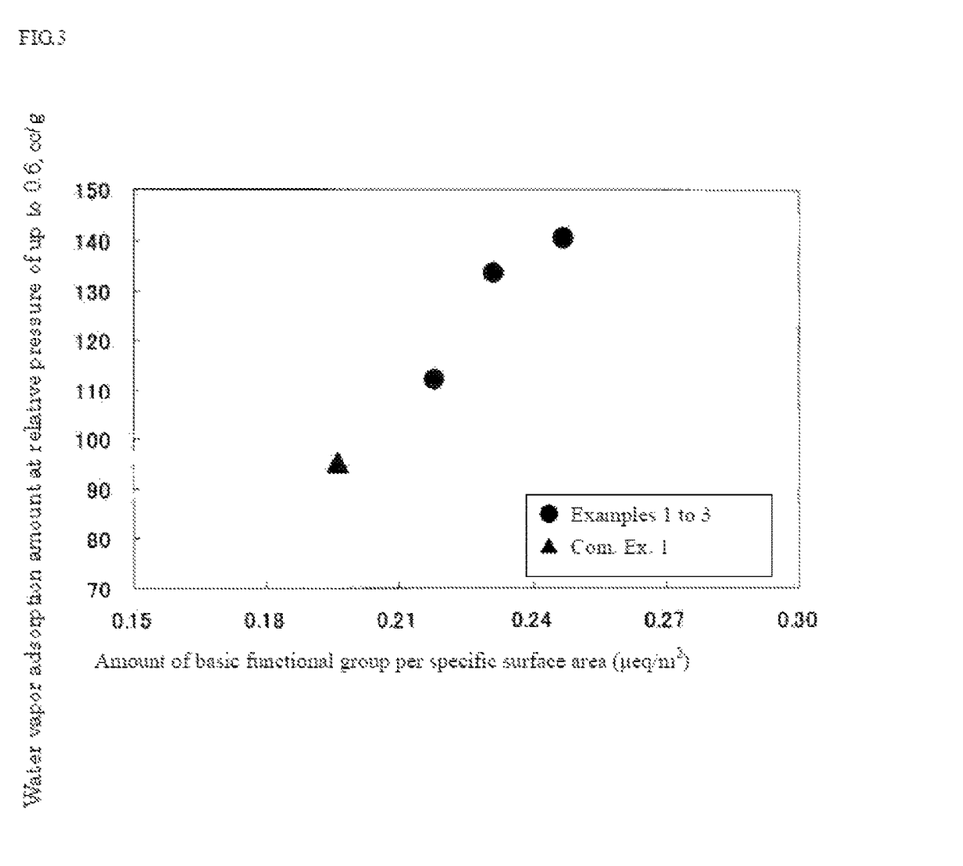
FIG. 3 is a diagram plotting the relationship between the amount of basic functional group per specific surface area and the water vapor adsorption amount in a lower relative pressure range.

Similarly, from FIG. 3 plotting the relationship between the amount of basic functional group per specific surface area and the water vapor adsorption amount in a lower relative pressure range, it is revealed that the water vapor adsorption amount increases with an increase of the amount of basic functional group per specific surface area. Furthermore, it can be confirmed that when the amount of basic functional group per specific surface area is equal to or more than 0.200 (µeq/g (Examples 1 to 3), the water vapor adsorption amount also increases.

The invention claimed is:

1. An activated carbon wherein an amount of basic functional group in the activated carbon is 0.470 meq/g or more, and wherein the activated carbon contains one or more of metal(s) and the content of each metal is 200 mg/kg or less and more than 0 mg/kg.

2. The activated carbon according to claim 1, wherein an amount of basic functional group per specific surface area of the activated carbon is 0.200 µmeq/m$^2$ or more.

3. The activated carbon according to claim 1, wherein a ratio of the amount of basic functional group and an amount of acidic functional group (the amount of basic functional group/the amount of acidic functional group) in the activated carbon is 1.00 or more.

4. The activated carbon according to claim 2, wherein a ratio of the amount of basic functional group and an amount of acidic functional group (the amount of basic functional group/the amount of acidic functional group) in the activated carbon is 1.00 or more.

5. The activated carbon according to claim 1, which is used for adsorption.

6. The activated carbon according to claim 2, which is used for adsorption.

7. The activated carbon according to claim 3, which is used for adsorption.

8. The activated carbon according to claim 4, which is used for adsorption.

9. A method for producing the activated carbon according to claim 1, comprising a step of imparting basic functional group by bringing the activated carbon into contact with a basic substance.

10. The method for producing an activated carbon according to claim 9, comprising a step of subjecting the activated carbon obtained in the step of imparting basic functional group to a heating treatment under an inert atmosphere.

11. The method for producing an activated carbon according to claim 9, comprising a step of washing the activated carbon obtained by an activation treatment with an inorganic acid.

12. The method for producing an activated carbon according to claim 10, comprising a step of washing the activated carbon obtained by an activation treatment with an inorganic acid.

* * * * *